United States Patent
Grass

(10) Patent No.: US 11,749,863 B2
(45) Date of Patent: Sep. 5, 2023

(54) METHOD FOR MOUNTING A BATTERY CONTROL UNIT ON A BATTERY HOUSING

(71) Applicant: Dr. Ing. h.c. F. Porsche Aktiengesellschaft, Stuttgart (DE)

(72) Inventor: Dominik Grass, Bietigheim-Bissingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 149 days.

(21) Appl. No.: 17/504,538

(22) Filed: Oct. 19, 2021

(65) Prior Publication Data

US 2022/0131228 A1 Apr. 28, 2022

(30) Foreign Application Priority Data

Oct. 23, 2020 (DE) ............ 10 2020 127 911.6

(51) Int. Cl.
*H01M 50/262* (2021.01)
*H01M 50/249* (2021.01)
*H01M 50/242* (2021.01)
*H01M 50/244* (2021.01)

(52) U.S. Cl.
CPC ....... *H01M 50/262* (2021.01); *H01M 50/242* (2021.01); *H01M 50/244* (2021.01); *H01M 50/249* (2021.01); *H01M 2220/20* (2013.01)

(58) Field of Classification Search
CPC ............ H01M 50/262; H01M 50/249; H01M 50/242; H01M 50/244; H01M 50/593; H01M 50/289; H01M 2220/20
See application file for complete search history.

(56) References Cited

U.S. PATENT DOCUMENTS 6,524,732 B1 2/2003 Iwaizono et al.
2021/0339617 A1 11/2021 Okhuma et al.

FOREIGN PATENT DOCUMENTS

| CN | 207504118 U | 6/2018 |
| CN | 209180841 U | 7/2019 |
| DE | 102016104169 A1 | 9/2017 |
| EP | 2339661 A1 | 6/2011 |
| EP | 3490024 A1 | 5/2019 |
| JP | 5621882 B2 | 11/2014 |
| JP | 2018163848 A | 10/2018 |
| KR | 2008063135 A * | 7/2008 ............ B60L 58/12 |
| WO | 2020044792 A1 | 3/2020 |

* cited by examiner

*Primary Examiner* — Christopher P Domone
*Assistant Examiner* — Jonathan William Estes
(74) *Attorney, Agent, or Firm* — LEYDIG, VOIT & MAYER, LTD.

(57) ABSTRACT

A method fastens a battery control unit to a battery housing. At least one spacer is fastened to the battery housing, and the battery control unit is fastened to the battery housing at least via the spacer. After fastening the spacer to the battery housing, the spacer is reworked by way of an ablative method on a side which faces the battery control unit to a height which is required for fastening the battery control unit.

11 Claims, 3 Drawing Sheets

METHOD FOR MOUNTING A BATTERY CONTROL UNIT ON A BATTERY HOUSING

CROSS REFERENCE TO RELATED APPLICATIONS

This application claims benefit to German Patent Application No. DE 10 2020 127 911.6, filed on Oct. 23, 2020, which is hereby incorporated by reference herein.

FIELD

The invention relates to a method for fastening a battery control unit to a battery housing and the battery control unit being fastened to the battery housing.

BACKGROUND

Electric vehicles usually have a traction battery, which has a plurality of battery cells, in which the electric energy for the operation of the electric vehicle is stored. The battery cells are usually arranged in a battery housing, the battery housing separating the battery cells reliably from the external environment and serving for the protection of the battery cells in the case of a crash. The traction battery usually has a battery control unit which serves, inter alia, for the monitoring, regulation and protection of battery cells. The battery control unit can be integrated in the battery housing or be fastened as a separate unit on the battery housing. The separate battery control unit has a separate housing, which is configured in a rigid manner and protects the electronic components of the battery control unit against damage. In the case of production of the traction battery, the housing of the battery control unit is fastened to the battery housing via a plurality of fastening points. Here, spacer elements are usually provided on the battery housing, via which spacer elements the housing of the battery control unit is fastened to the battery housing.

SUMMARY

In an embodiment, the present disclosure provides a method fastens a battery control unit to a battery housing. At least one spacer is fastened to the battery housing, and the battery control unit is fastened to the battery housing at least via the spacer. After fastening the spacer to the battery housing, the spacer is reworked by way of an ablative method on a side which faces the battery control unit to a height which is required for fastening the battery control unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
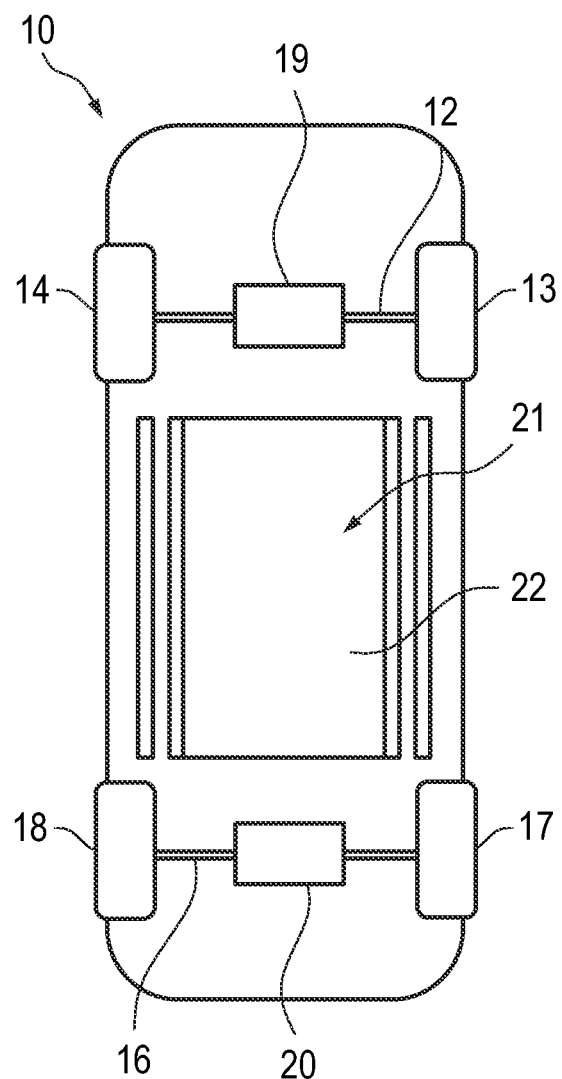
FIG. 1 diagrammatically shows an electric vehicle with a traction battery.

The present inventors have recognized that it is a problem that, in the case of the production of the battery housing, dimensional deviations of such a type occur at the fastening points of the housing of the battery control unit, that is to say the height of the spacer elements varies in such a way, that the housing of the battery control unit is tensioned by way of the fastening to the battery housing and can be damaged as a result. Reliable operation of the traction battery cannot be ensured as a result of damage of the battery control unit.

Embodiments of the invention provide a method for mounting a battery control unit, by way of which mounting of the battery control unit is made possible, without the battery control unit being damaged during the mounting process.

By virtue of the fact that, after fastening to the battery housing, the at least one spacer element is reworked by way of an ablative method on a side which faces the battery control unit to a required height, the dimensional deviations of the battery housing become irrelevant for the fastening of the battery control unit, since the dimensional deviations of the battery housing are compensated for by virtue of the fact that the fastening surface of the spacer element is ablated to a required height only after the production of the battery housing. After the ablative method, the battery control unit is deposited on the fastening surfaces and is fastened to the latter. Tensioning, in particular twisting, of the battery control unit on account of the fastening to the battery housing can be avoided reliably. This ensures that the battery control unit is not damaged during mounting on the battery housing.

The spacer element is preferably welded to the battery housing. As a result, a reliable and inexpensive connection can be established between the spacer element and the battery housing.

In one preferred refinement, the battery housing has a housing main body and a housing cover, the battery control unit being arranged on a side of the housing cover, which side faces away from the housing main body, and the battery control unit being fastened together with the housing cover to the spacer element. The spacer element is arranged in the interior of the battery housing, the housing cover bearing against the spacer element. The battery control unit bears at its fastening points against the housing cover. In this way, a fastening section of the battery control unit, for example a tab, forms a sandwich-like structure with the housing cover and the spacer element. The fastening of the housing cover and the battery control unit to the spacer element can take place by way of a fastening means which penetrates the housing cover and the fastening section of the battery control unit, preferably in each case an opening, a radial projection which is provided at a first axial end of the fastening means bearing axially against the fastening section of the battery control unit, and a second axial end of the fastening means being fastened to the spacer element.

The battery control unit and the housing cover are preferably screwed to the spacer element, the housing cover being clamped in between the spacer element and the battery control unit. The screw connection is a simple and inexpensive variant to reliably connect a plurality of components which are arranged on one another to one another.

In one preferred refinement, a washer is inserted between the spacer element and the housing cover. In one preferred refinement, the washer is overmolded by a plastic component of the battery housing. The surface pressure on the spacer element and the housing cover is reduced by way of the washer, as a result of which, in particular, an undesired deformation on the housing cover is prevented. The overmolding of the washer simplifies the mounting process of the battery control unit, the plastic component with the washer already having been fastened to the battery housing or to the battery cover in a preceding step. Therefore, a separate insertion of the washer during the mounting of the battery control unit is dispensed with.

The housing main body, in a preferred embodiment, has a housing frame and a bottom element, the housing frame having a plurality of crossmembers and a plurality of longitudinal carriers, the crossmembers and the longitudinal carriers being welded to one another. The welding of the crossmembers and longitudinal carriers to form the housing frame leads to a distortion of the battery housing and, in particular, to dimensional deviations of the battery housing. In the case of a welded battery housing, in particular, reworking of the spacer element should be done, in order to ensure fastening of the battery control unit, which fastening is reliable and avoids tensions.

In one preferred refinement, the crossmembers and/or the longitudinal carriers are produced by way of an extrusion molding method. As a result, the battery housing can be produced in a simple and inexpensive way.

The crossmembers and/or the longitudinal carriers may preferably be produced from aluminum. As a result, the weight of the battery housing and therefore of the traction battery can be reduced.

In one preferred refinement, a plurality of spacer elements are provided, the spacer elements being reworked to a common height after fastening to the battery housing. As a result, the battery control unit can be fastened to the battery housing reliably and without tensions which are caused by way of the mounting.

The ablative method may preferably be a milling method, as a result of which the spacer element can be reworked in a simple and inexpensive way. The working of the spacer element by way of the ablative method can take place together with other components which are to be worked on the battery housing.

By way of a method of this type, the mounting of the battery control unit on the battery housing can be simplified, and damage on account of dimensional deviations on the battery housing can be avoided.

FIG. 1 shows an electric vehicle 10 with an all-wheel drive system, the electric vehicle 10 having two drive axles 12, 16. The first drive axle 12 which is the front axle is connected to an electric drive 19 and, during driving operation of the electric vehicle 10, drives two wheels 13, 14, namely the front wheels. The second drive axle 16 is connected to a second electric drive 20, and likewise drives two wheels 17, 18, namely the rear wheels. The electric drives 19, 20 are connected electrically to a traction battery 21 which supplies the electric drives 19, 20 with electric energy during driving operation. The traction battery 21 is configured as an underfloor battery, and is therefore arranged on the undertray of the electric vehicle 10.

Figure 2:
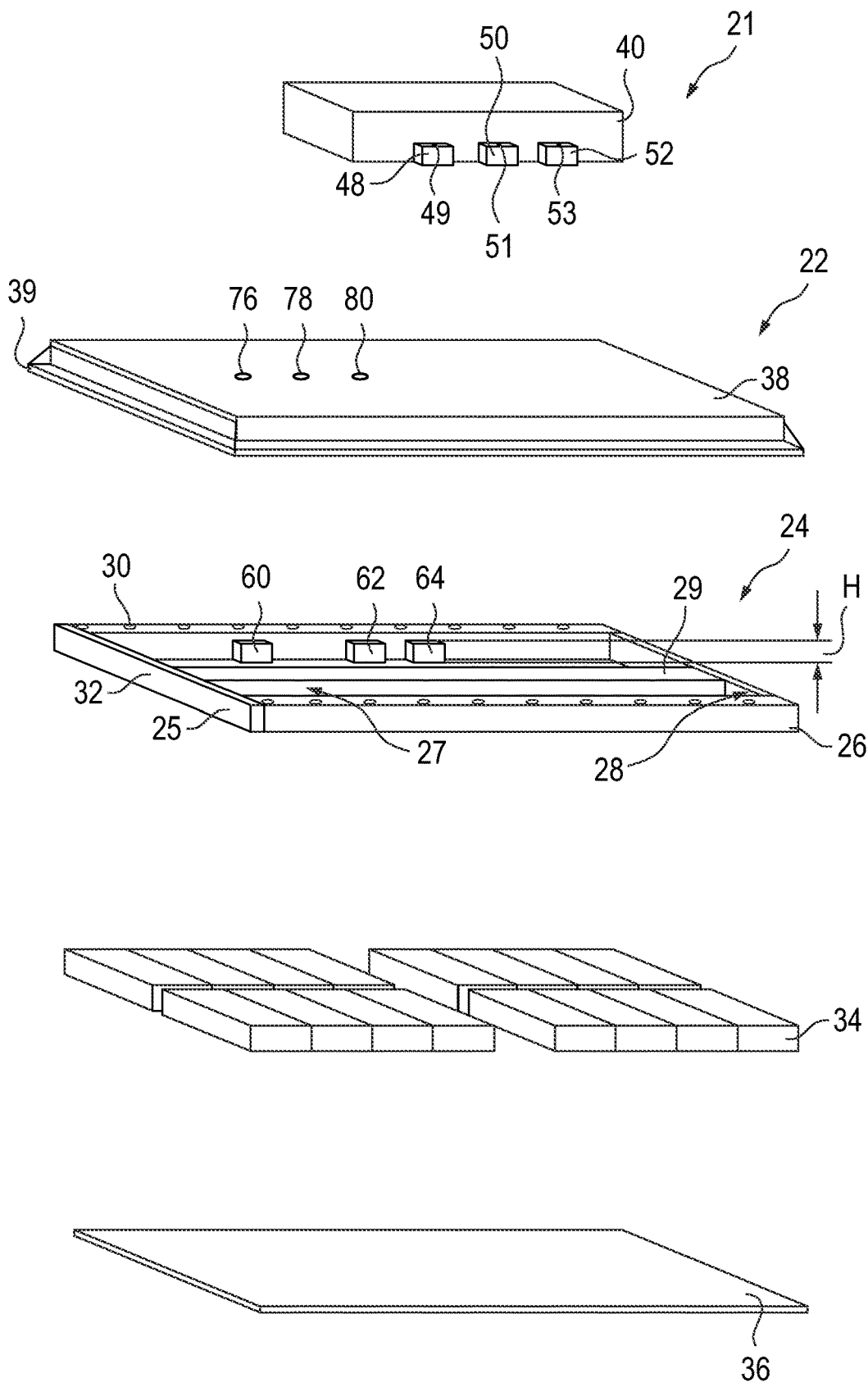
FIG. 2 shows an exploded view of the traction battery of the electric vehicle from FIG. 1.

FIG. 2 shows the traction battery 21. The traction battery 21 has a battery housing 22, which has a housing main body 24 and a housing cover 38. The housing main body 24 comprises a housing frame 25 and a bottom element 36, the housing frame 25 being composed of two crossmembers 28, 32 and three longitudinal carriers 26, 30, 32. The cross members 28, 32 are configured as an aluminum extruded profile, and are welded to the two outer longitudinal carriers 26, 30. A middle longitudinal carrier 29 is likewise welded on the end side to the crossmembers 28, 32. The longitudinal carriers 26, 29, 30 are likewise produced from an aluminum extruded profile. The bottom element 36 is configured as a metal sheet, and is fastened to an open side of the housing frame 25, which open side faces a roadway. The housing cover 38 is arranged on the opposite side of the housing frame 25, which housing cover 38 is of shell-shaped configuration and is screwed, inter alia, via a circumferential collar 39 to the crossmembers and longitudinal carriers 26, 28, 30, 32. The housing cover 38, the housing frame 25 and the bottom element 36 delimit an interior space 27.

The traction battery 21 has a plurality of battery modules 34, each battery module 34 having a battery module housing with a plurality of battery cells which are arranged therein. The battery modules 34 are arranged next to one another in the interior space 27.

Furthermore, the traction battery 21 has a battery control unit 40 which is arranged on a side of the housing cover 38, which side faces away from the interior space 27, and is fastened to the battery housing 22. For fastening purposes, the battery control unit 40 has a plurality of fastening sections 48, 50, 52 which in each case have a through opening 49, 51, 53, through which a fastening means is plugged in each case.

Figure 3:
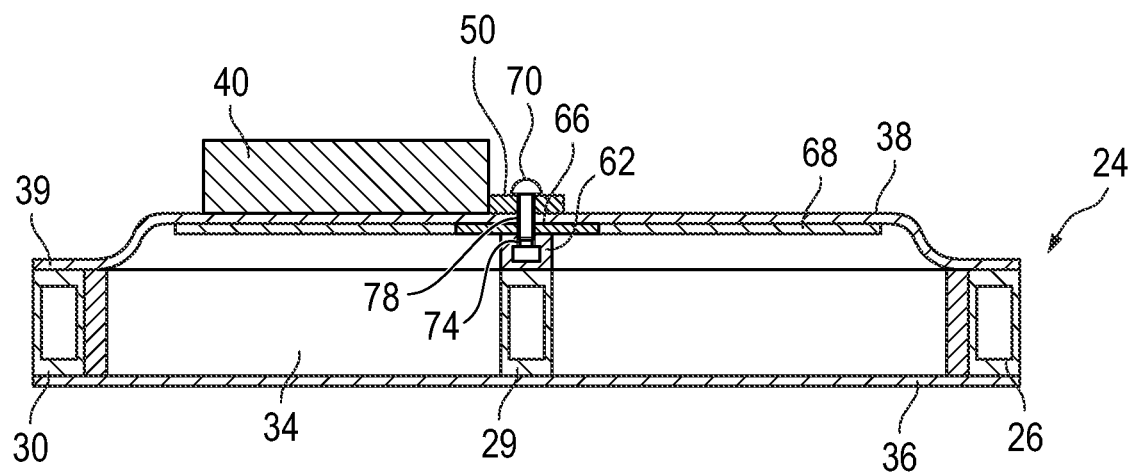
FIG. 3 shows a sectional illustration of the traction battery from FIGS. 1 and 2.

The fastening of the battery control unit 40 to the battery housing 22 is described on the basis of FIG. 3. The fastening of the battery control unit 40 takes place on the centrally arranged longitudinal carrier 29, the shell-shaped cover element 38 being spaced apart from the longitudinal carrier 29 in the region of the fastening, and there being a cavity between the cover element 38 and the longitudinal carrier 29. The cavity is filled at least in the region of the fastening sections 48, 50, 52 of the battery control unit 40 by way of three spacer elements 60, 62, 64 which are shown in FIG. 2, with the result that the cover element 38 bears against the spacer elements 60, 62, 64. A washer 66 is arranged in each case between the cover element 38 and the spacer elements 60, 62, 64, by way of which washer 66, in particular, the surface pressure on the cover element is reduced, the washers 66 being overmolded by a plastic component 68 which is fastened to the cover element 38. The fastening of the battery control unit 40 takes place by way of a plurality of screws 70. The spacer elements 60, 62, 64 can be configured from a solid material or from a hollow profile.

Figure 4:
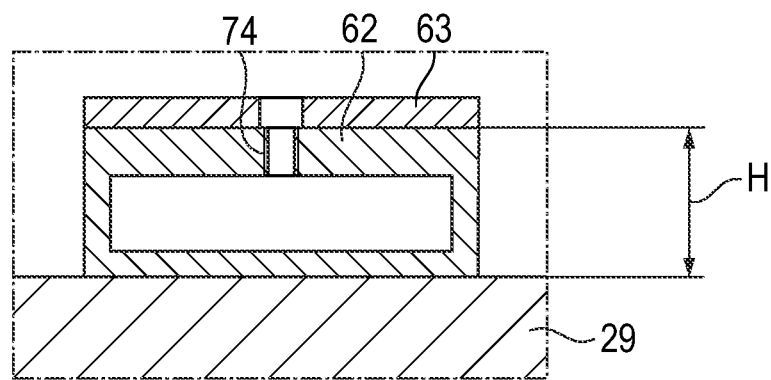
FIG. 4 shows a detail of the traction battery from FIG. 3.

During the production of the traction battery 21, the housing frame 25 is first of all welded together from the crossmembers 28, 32 and the longitudinal carriers 26, 30, 32. Subsequently, the bottom element 36 is fastened to the housing frame 25, and the spacer elements 60, 62, 64, which are configured as hollow profiles are welded onto the housing frame 25. At the same time, the plastic component 68 with the washers 66 is fastened to the housing cover 38. According to an embodiment of the invention, after fastening to the housing frame 25, the spacer elements 60, 62, 64 are reworked to a uniform height H by way of milling, with the result that those surfaces of the spacer elements 60, 62, 64 which face the battery control unit 40 and the housing cover 38 are arranged in a common plane. FIG. 4 shows by way of example the spacer element 62, an upper section 63 being ablated by way of the milling method. Here, after the milling operation, the spacer element 62 has a residual wall thickness which is such that the screws 70 can be screwed in. In a last step, the battery modules 34 are inserted into the interior space 27, and the housing cover 38 and the battery control unit 40 are fastened, inter alia, to the spacer elements 60, 62, 64. The fastening takes place by way of a plurality of screws 70, the screws 70 being plugged through the openings 49, 51, 53 of the fastening sections 48, 50, 52 of the battery control unit 40 and through the openings 76, 78, 80 which are provided on the housing cover 38, and being screwed into the spacer elements 60, 62, 64. The spacer elements 60, 62, 64 in each case have a thread 74. FIG. 3 shows the fastening to one of the three spacer elements 60, 62, 64.

By way of a method of this type, the battery control unit 40 can be mounted reliably on the battery housing 22, it being possible for tensions to be avoided reliably on the battery control unit 40 by way of the reworking of the spacer elements 60, 62, 64 only after fastening to the battery housing 22.

Other structural embodiments, which fall within the scope of protection of the main claim, than the embodiments which are described are also possible.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for fastening a battery control unit to a battery housing, wherein at least one of a spacer is fastened to the battery housing, and the battery control unit is fastened to the battery housing at least via the spacer, the method comprising:
after fastening the spacer to the battery housing, reworking the spacer by way of an ablative method on a side which faces the battery control unit to a height which is required for fastening the battery control unit.

2. The method as claimed in claim 1, wherein the spacer is welded to the battery housing.

3. The method as claimed in claim 1, wherein:
the battery housing has a housing main body and a housing cover, the battery control unit being arranged on a side of the housing cover, wherein the side faces away from the housing main body, and the battery control unit being fastened together with the housing cover to the spacer.

4. The method as claimed in claim 3, wherein:
the battery control unit and the housing cover are screwed to the spacer, the housing cover being clamped in between the spacer and the battery control unit.

5. The method as claimed in claim 3, wherein a washer is inserted between the spacer and the housing cover.

6. The method as claimed in claim 5, wherein the washer is overmolded by a plastic component of the battery housing.

7. The method as claimed in claim 3, wherein:
the housing main body has a housing frame and a bottom element, wherein the housing frame has a plurality of crossmembers and a plurality of longitudinal carriers, and the crossmembers and the longitudinal carriers are welded to one another.

8. The method as claimed in claim 7, wherein the crossmembers or the longitudinal carriers are produced by way of an extrusion molding method.

9. The method as claimed in claim 7, wherein the crossmembers or the longitudinal carriers are produced from aluminum.

10. The method as claimed in claim 1, wherein a plurality of spacers are provided, wherein the method further comprises reworking the spacers to a common height after fastening to the battery housing, and where the spacers comprise the spacer.

11. The method as claimed in claim 1, wherein the ablative method is a milling method.

* * * * *